US010442351B2

(12) United States Patent
Aoki et al.

(10) Patent No.: US 10,442,351 B2
(45) Date of Patent: Oct. 15, 2019

(54) NAVIGATION TERMINAL, NAVIGATION SYSTEM, WEARABLE TERMINAL, NAVIGATION METHOD, AND RECORDING MEDIUM

(71) Applicant: Panasonic Intellectual Property Corporation of America, Torrance, CA (US)

(72) Inventors: Hideshi Aoki, Osaka (JP); Tetsuji Fuchikami, Osaka (JP); Kazuki Funase, Osaka (JP); Akinori Ozeki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 2 days.

(21) Appl. No.: 15/843,164

(22) Filed: Dec. 15, 2017

(65) Prior Publication Data

US 2018/0105105 A1 Apr. 19, 2018

Related U.S. Application Data

(63) Continuation of application No. PCT/JP2017/000710, filed on Jan. 12, 2017.

(30) Foreign Application Priority Data

Jan. 29, 2016 (JP) ................................ 2016-016692

(51) Int. Cl.
*B60Q 9/00* (2006.01)
*H04W 4/024* (2018.01)
(Continued)

(52) U.S. Cl.
CPC ............... *B60Q 9/00* (2013.01); *B60W 50/16* (2013.01); *G01C 21/34* (2013.01);
(Continued)

(58) Field of Classification Search
CPC ......... B60Q 9/00; B60W 50/16; G01C 21/34; G01C 21/36; G06F 1/163; H04W 4/023
(Continued)

(56) References Cited

U.S. PATENT DOCUMENTS 6,154,703 A 11/2000 Nakai et al.
8,996,296 B2 * 3/2015 Xiang ................ G01C 21/3629
701/408
(Continued)

FOREIGN PATENT DOCUMENTS

JP 11-014393 1/1999
JP 2004-361363 12/2004
(Continued)

OTHER PUBLICATIONS

International Search Report of PCT application No. PCT/JP2017/000710 dated Apr. 18, 2017.

*Primary Examiner* — Kam Wan Ma

(74) *Attorney, Agent, or Firm* — Greenblum & Bernstein, P.L.C.

(57) ABSTRACT

A navigation terminal includes a communicator, an alerter, and a processor. The processor obtains destination information indicating a user's destination, obtains first location information indicating the location of the navigation terminal, starts navigation according to a route calculated based on the destination information and the first location information, obtains second location information indicating the location of the navigation terminal after starting the navigation, starts the alerter when the distance from the location indicated by the second location information to a predetermined spot on the route becomes smaller than or equal to the first distance, and causes the communicator to transmit a control signal to a wearable terminal of the user to vibrate a vibrator in the wearable terminal when the distance from the location indicated by the second location information to the predetermined spot becomes smaller than or equal to a second distance smaller than the first distance.

22 Claims, 10 Drawing Sheets

(51) Int. Cl.
*G01C 21/36* (2006.01)
*B60W 50/16* (2012.01)
*G01C 21/34* (2006.01)
*G06F 1/16* (2006.01)
*H04W 4/04* (2009.01)
*H04W 4/02* (2018.01)
*H04L 29/08* (2006.01)

(52) U.S. Cl.
CPC ......... *G01C 21/3415* (2013.01); *G01C 21/36* (2013.01); *G01C 21/3605* (2013.01); *G01C 21/3652* (2013.01); *G01C 21/3688* (2013.01); *G06F 1/163* (2013.01); *H04W 4/023* (2013.01); *H04W 4/024* (2018.02); *H04W 4/04* (2013.01); *B60W 2540/22* (2013.01); *G06F 1/1694* (2013.01); *H04L 67/18* (2013.01)

(58) Field of Classification Search
USPC ........................................................ 340/457
See application file for complete search history.

(56) References Cited

U.S. PATENT DOCUMENTS

| | | | | |
|---|---|---|---|---|
| 9,329,695 | B2* | 5/2016 | Kozuka | G06F 3/017 |
| 2005/0131638 | A1* | 6/2005 | Sencaj | G01C 21/3676 |
| | | | | 701/533 |
| 2007/0124027 | A1 | 5/2007 | Betzitza et al. | |
| 2012/0089300 | A1* | 4/2012 | Wolterman | B60Q 1/34 |
| | | | | 701/36 |
| 2014/0168349 | A1* | 6/2014 | Eom | G02B 27/01 |
| | | | | 348/14.03 |
| 2014/0365113 | A1* | 12/2014 | McGavran | G01C 21/00 |
| | | | | 701/425 |
| 2015/0134249 | A1* | 5/2015 | Yen | G01C 21/20 |
| | | | | 701/541 |
| 2015/0198448 | A1* | 7/2015 | Sanma | G08G 1/166 |
| | | | | 701/400 |
| 2015/0266413 | A1* | 9/2015 | Raubvogel | B60K 37/06 |
| | | | | 701/36 |
| 2016/0046294 | A1* | 2/2016 | Lee | B60W 40/08 |
| | | | | 340/576 |
| 2016/0139274 | A1* | 5/2016 | Morimoto | G01S 19/51 |
| | | | | 701/300 |
| 2016/0146609 | A1* | 5/2016 | Ma | G01C 21/165 |
| | | | | 701/533 |
| 2016/0209223 | A1* | 7/2016 | Kim | G01C 21/365 |
| 2016/0259422 | A1* | 9/2016 | Funase | G06F 3/017 |
| 2016/0265917 | A1* | 9/2016 | Yamamoto | G01C 21/3655 |
| 2016/0335817 | A1* | 11/2016 | Hatton | G07C 5/0816 |
| 2016/0374614 | A1* | 12/2016 | Cavallaro | A61B 5/6898 |
| | | | | 702/181 |

FOREIGN PATENT DOCUMENTS

| | | |
|---|---|---|
| JP | 2007-506166 | 3/2007 |
| JP | 2008-186263 | 8/2008 |
| JP | 2009-008600 | 1/2009 |

* cited by examiner

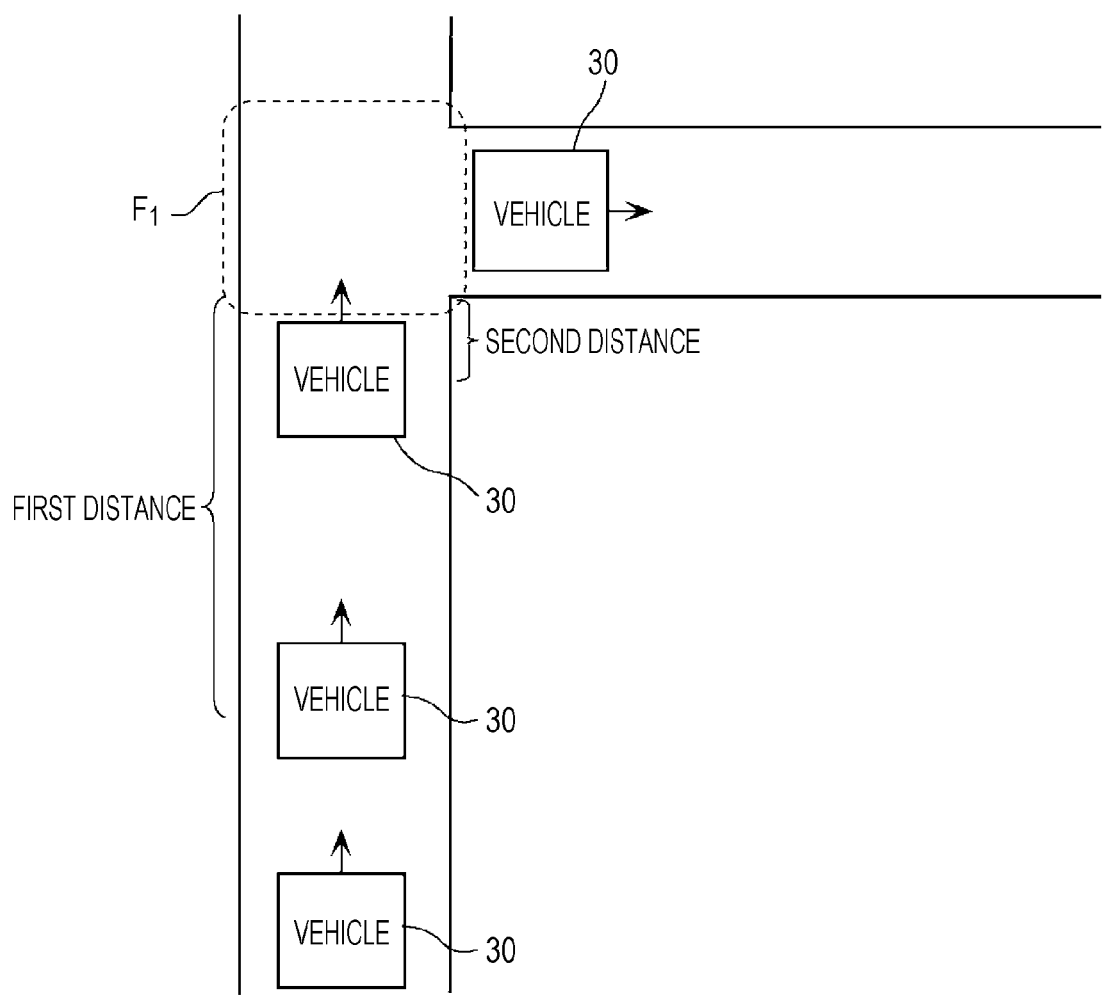

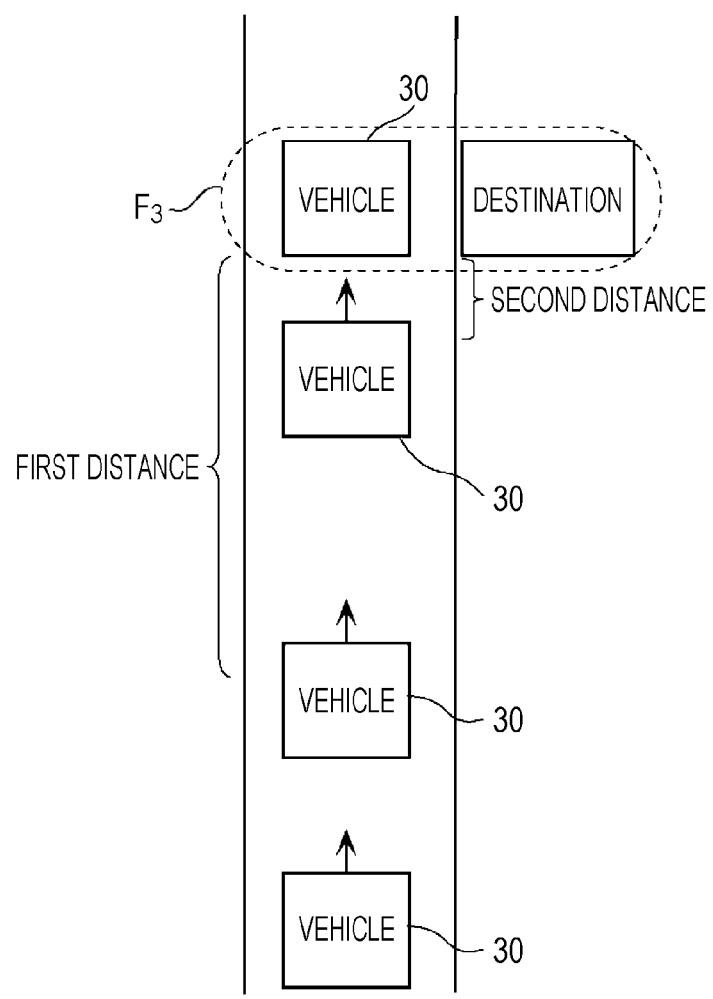

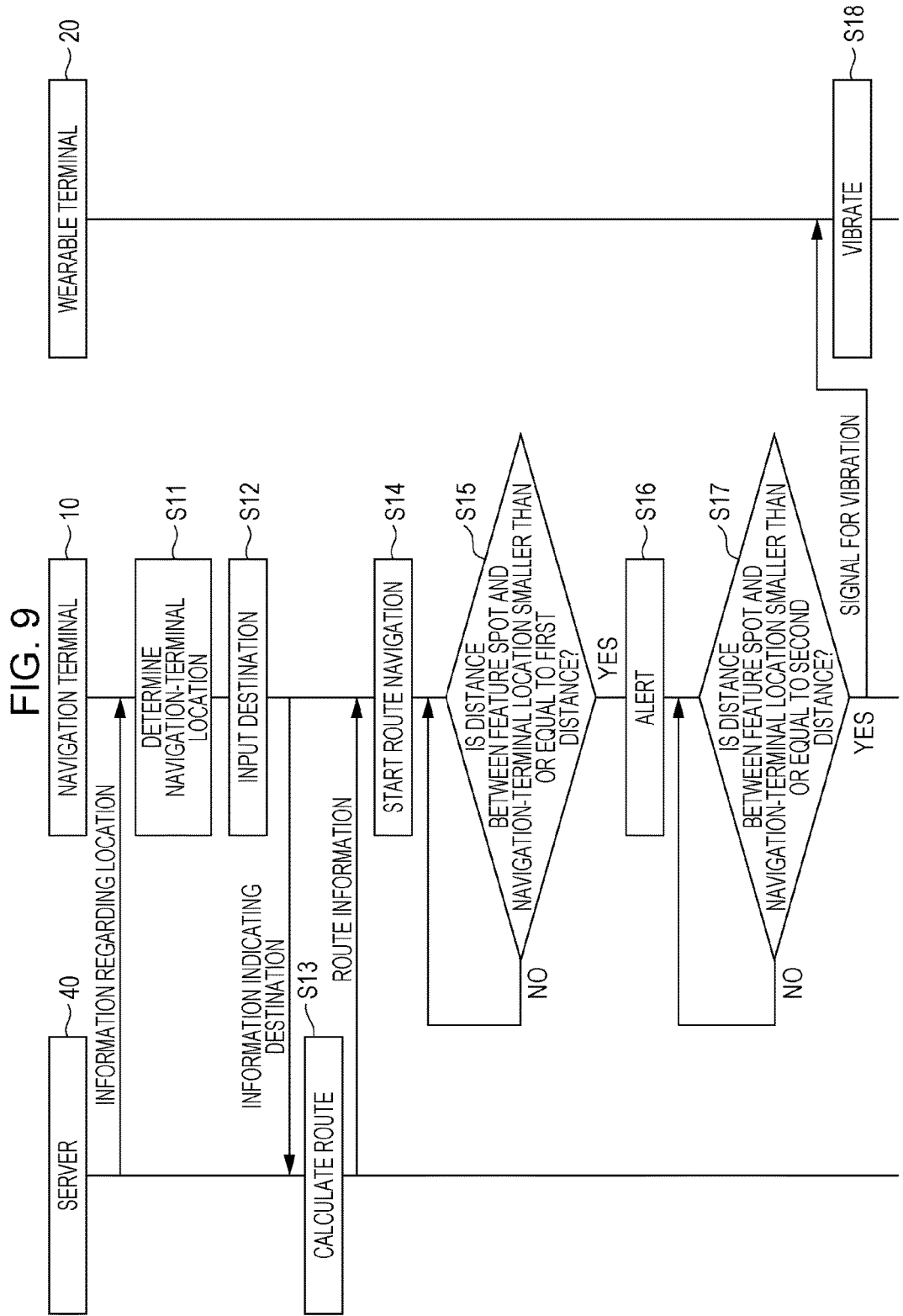

NAVIGATION TERMINAL, NAVIGATION SYSTEM, WEARABLE TERMINAL, NAVIGATION METHOD, AND RECORDING MEDIUM

BACKGROUND

1. Technical Field

The present disclosure relates to a navigation terminal, a navigation system, a wearable terminal, a navigation method, and a recording medium.

2. Description of the Related Art

In typical navigation systems, a user is notified about a particular spot, such as a corner, on a route, and this notification is given before the user actually arrives at the spot, such as a corner.

Thus, there are cases in which the user cannot understand at which corner the user should turn and goes straight ahead without turning at a corner at which he or she should turn.

To address this problem, a navigation system has been proposed that determines a user's moving state, such as a state in which a user is boarding an airplane, is boarding a ship, is walking, is riding a bicycle, or is riding a transportation system, and that performs route navigation corresponding to the user's moving state, such as changing the notification timing in accordance with the moving state (see, for example, Japanese Unexamined Patent Application Publication No. 2004-361363).

However, even when the notification timing is changed in accordance with the moving state of the user by using the aforementioned related art, there is a possibility that the user does not notice a notification about a corner where he or she should turn or a possibility that his or her reaction to the notice is delayed even if he or she notices it. Thus, there is still a problem that the user goes straight ahead without turning at the corner where he or she should turn. That is, even when the aforementioned related art is used, there is a problem that the user cannot recognize a feature spot he or she should recognize.

SUMMARY

In one general aspect, the techniques disclosed here feature a navigation terminal including a communicator, an alerter, and a processor. The processor obtains destination information indicating a destination of a user, obtains first location information indicating a location of the navigation terminal, starts navigation in accordance with first route information including a first route from the location indicated by the first location information to the destination, the first route being calculated based on the destination information and the first location information, obtains second location information indicating the location of the navigation terminal after starting the navigation, starts the alerter when a distance from the location indicated by the second location information to a predetermined spot becomes smaller than or equal to a first distance based on the first route information, the predetermined spot being indicated by the first route information and being located on the route, and causes the communicator to transmit a control signal for vibrating a vibrator included in a wearable terminal worn by the user to the wearable terminal, when the distance from the location indicated by the second location information to the predetermined spot becomes smaller than or equal to a second distance smaller than the first distance.

According to the present disclosure, it is possible to realize a navigation terminal and so on that can give a notification with which a user can more easily recognize a feature spot he or she should recognize.

These general and specific aspects may be implemented using a system, a method, a computer program, or any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating one example of a first distance and a second distance on a route according to the present embodiment;

FIG. 8 is a diagram illustrating one example of a first distance and a second distance on a route according to the present embodiment; and FIG. 9 is a flowchart illustrating one example of the operation of the navigation system according to the embodiment.

Figure 1:
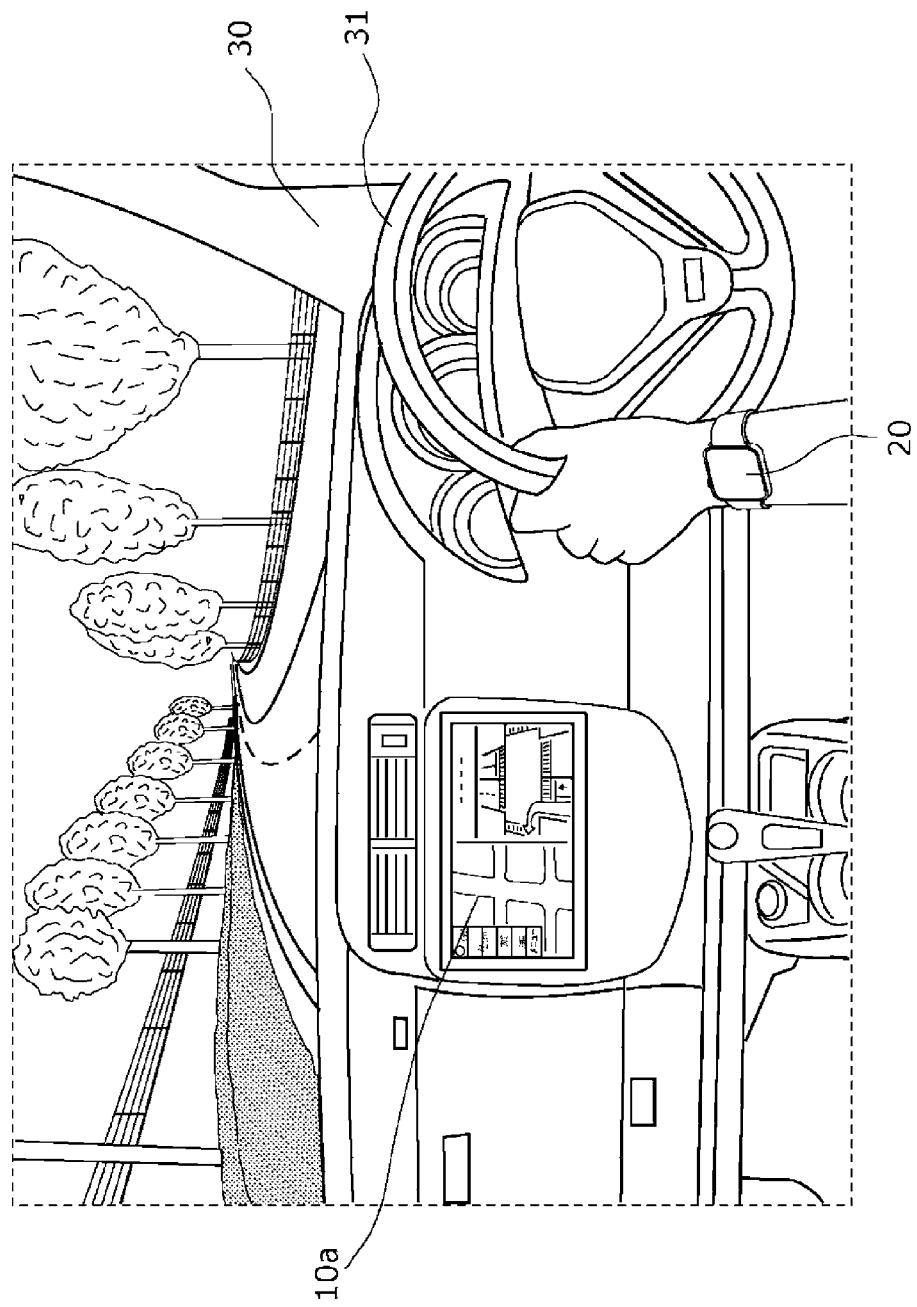
FIG. 1 is a view illustrating one example of a use scene of a navigation system in the present embodiment.

DETAILED DESCRIPTION (1) A navigation terminal according to one aspect of the present disclosure includes a communicator, an alerter, and a processor. The processor obtains destination information indicating a destination of a user, obtains first location information indicating a location of the navigation terminal, starts navigation in accordance with first route information including a first route from the location indicated by the first location information to the destination, the first route being calculated based on the destination information and the first location information, obtains second location information indicating the location of the navigation terminal after starting the navigation, starts the alerter when a distance from the location indicated by the second location information to a predetermined spot becomes smaller than or equal to a first distance based on the first route information, the predetermined spot being indicated by the first route information and being located on the route, and causes the communicator to transmit a control signal for vibrating a vibrator included in a wearable terminal worn by the user to the wearable terminal, when the distance from the location indicated by the second location information to the predetermined spot becomes smaller than or equal to a second distance smaller than the first distance.

This makes it possible to give a notification with which the user can more easily recognize a feature spot he or she should recognize.

More specifically, the navigation terminal can directly notify the user at a timing appropriate for the user by using vibration of the wearable terminal worn by the user.

(2) In the above-described aspect, the navigation terminal may further include a speaker. By causing the speaker to output sound, the alerter may alert the user that the distance from the location indicated by the second location information to the predetermined spot becomes smaller than or equal to the first distance.

(3) In the above-described aspect, the navigation terminal may further include a speaker. By causing the speaker to output warning sound, the alerter may alert the user that the distance from the location indicated by the second location information to the predetermined spot becomes smaller than or equal to the first distance.

(4) In the above-described aspect, the navigation terminal may further include a display. By causing the display to display a message, the alerter may alert the user that the distance from the location indicated by the second location information to the predetermined spot becomes smaller than or equal to the first distance.

(5) In the above-described aspect, the navigation terminal may be mounted on a vehicle; the user may be a driver of the vehicle; the wearable terminal may be worn on an upper limb of the user; the communicator may receive, from the wearable terminal, a result of detection of the user's operation on a steering wheel in a vehicle, the detection being performed by a sensor included in the wearable terminal; and the processor may cause the communicator to transmit a control signal for the vibrator, based on the result of the detection.

(6) In the above-described aspect, the processor may determine whether or not the user turns the steering wheel a predetermined angle or more, based on the result of the detection, and may cause the communicator to transmit a control signal for stopping the vibrator to the wearable terminal, when the distance from the location indicated by the second location information to the predetermined spot is smaller than or equal to the second distance, and it is determined that the user turns the steering wheel the predetermined angle or more.

(7) In the above-described aspect, the processor may determine whether or not the user turns the steering wheel a predetermined angle or more, based on the result of the detection, and may newly start navigation in accordance with second route information including a route newly calculated based on the destination information and the second location information and may cause the communicator to transmit a control signal for stopping the vibrator to the wearable terminal, when the distance from the location indicated by the second location information to the predetermined spot is smaller than or equal to the second distance, and it is determined that the user does not turn the steering wheel the predetermined angle or more.

(8) In the above-described aspect, the predetermined spot may be a spot that is indicated by the first route information and where a diverging point on the route is located; and the processor may further determine whether or not the navigation terminal is traveling along the first route after passing the diverging point, based on the second location information and the first route information, and may cause the communicator to transmit a control signal for stopping the vibrator to the wearable terminal, when the distance from the location indicated by the second location information to the predetermined spot is smaller than or equal to the second distance, and it is determined that the navigation terminal is traveling along the first route after passing the diverging point.

(9) In the above-described aspect, the predetermined spot may be a spot that is indicated by the first route information and where a diverging point on the route is located; and the processor may further determine whether or not the navigation terminal is traveling along the first route after passing the diverging point, based on the second location information and the first route information, and may newly start navigation in accordance with second route information including a route newly calculated based on the destination information and the second location information and may cause the communicator to transmit a control signal for stopping the vibrator to the wearable terminal, when the distance from the location indicated by the second location information to the predetermined spot is smaller than or equal to the second distance, and it is determined that the navigation terminal is not traveling along the first route after passing the diverging point.

(10) In the above-described aspect, the predetermined spot may be a spot where a diverging point on the route exists, the spot being indicated by the first route information; and the processor may further determine whether or not the navigation terminal is traveling along the first route after passing the diverging point, based on the second location information and the first route information, and may cause the communicator to transmit a control signal for stopping the vibrator to the wearable terminal, when the distance from the location indicated by the second location information to the predetermined spot is smaller than or equal to the first distance and is larger than the second distance, and it is determined that the navigation terminal is traveling along the first route after passing the diverging point.

(11) In the above-described aspect, the wearable terminal may be worn on an upper limb of the user; the communicator may receive, from the wearable terminal, biometric information indicating a vital value of the user, the vital value being detected by a sensor included in the wearable terminal; and the processor may further set the second distance to a length larger than a predetermined distance, when the vital value is larger than a predetermined value, and may set the second distance to a length smaller than or equal to the predetermined distance, when the vital value is smaller than or equal to the predetermined value.

(12) In the above-described aspect, the vital value may include one of a heart rate, a body temperature, and a respiration rate.

(13) In the above-described aspect, the wearable terminal may be worn on an upper limb of the user; the communicator may receive, from the wearable terminal, biometric information indicating a vital value of the user, the vital value being detected by a sensor included in the wearable terminal; and the processor may further cause the communicator to transmit, to the wearable terminal, a control signal for making a magnitude of the vibration of the vibrator smaller than a predetermined value, when the vital value is larger than a predetermined value, and may cause the communicator to transmit, to the wearable terminal, a control signal for making the magnitude of the vibration of the vibrator larger than or equal to the predetermined value, when the vital value is smaller than or equal to the predetermined value.

(14) In the above-described aspect, the navigation terminal may be connected to a server; and the communicator may receive the first route information from the server.

(15) In the above-described aspect, the navigation terminal may further include a memory. The processor may calculate the first route, based on map information stored in the memory, the destination information, and the first location information, the map information indicating locations and shapes of roads and the predetermined spot located along any of the roads.

(16) In the above-described aspect, the navigation terminal may further include a memory. The alerter may include a program stored in the memory.

(17) A navigation system according to one aspect of the present disclosure includes a navigation terminal and a wearable terminal worn by a user. The navigation terminal includes a communicator, an alerter, and a processor. The processor obtains destination information indicating a destination of the user, obtains first location information indicating a location of the navigation terminal, starts navigation in accordance with first route information including a first route from the location indicated by the first location information to the destination, the first route being calculated based on the destination information and the first location information, obtains second location information indicating the location of the navigation terminal after starting the navigation, starts the alerter when a distance from the location indicated by the second location information to a predetermined spot becomes smaller than or equal to a first distance based on the first route information, the predetermined spot being indicated by the first route information and being located on the route, and causes the communicator to transmit a control signal for vibrating a vibrator included in the wearable terminal to the wearable terminal, when the distance from the location indicated by the second location information to the predetermined spot becomes smaller than or equal to a second distance smaller than the first distance.

The embodiments described below each represents a specific example of the present disclosure. Numerical values, shapes, constituent elements, steps, the order of steps, and so on described in the embodiments below are examples and are not intended to limit the present disclosure. Of the constituent elements in the embodiments described below, the constituent elements not set forth in the independent claims that represent the broadest concept will be described as optional constituent elements. In all embodiments, what are described may also be combined together.

Embodiment

The following description will be given of a navigation terminal 10 and so on according to one aspect of the present disclosure.

[Navigation System 1]

Figure 2:
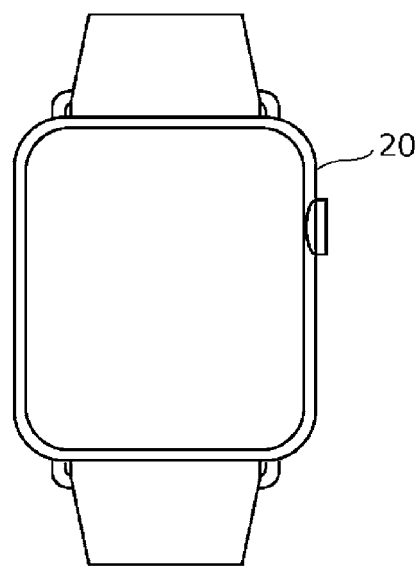
FIG. 2 is a view illustrating one example of the external appearance of a wristwatch wearable terminal in the present embodiment.
Figure 3:
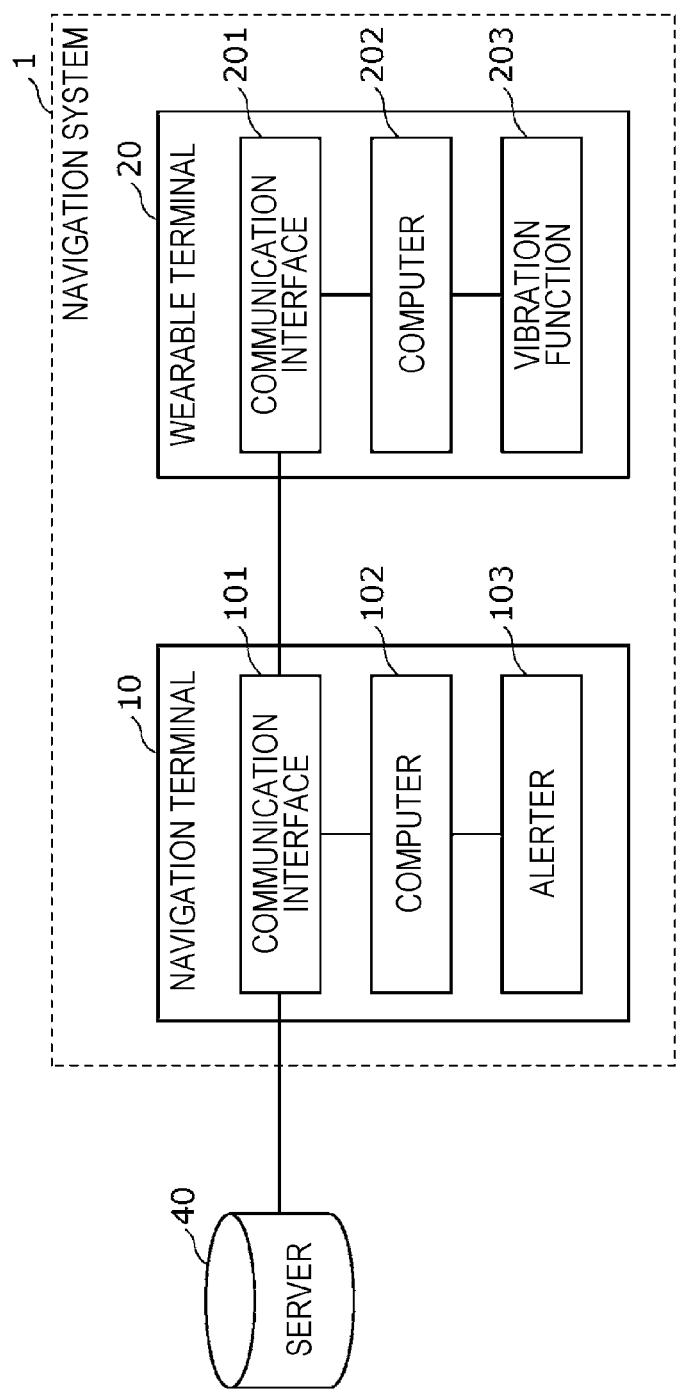
FIG. 3 is a functional block diagram illustrating the configuration of the navigation system according to the present embodiment.

FIG. 1 is a view illustrating one example of a use scene of a navigation system 1 in the present embodiment. FIG. 2 is a view illustrating one example of the external appearance of a wristwatch wearable terminal 20 in the present embodiment. FIG. 3 is a functional block diagram illustrating the configuration of the navigation system 1 according to the present embodiment.

FIG. 1 illustrates an example of a case in which the navigation system 1 is used in a vehicle 30. A vehicle navigator 10a in the vehicle 30 illustrated in FIG. 1 has the navigation terminal 10 (described below) in the present embodiment, and a user drives the vehicle 30 by steering a steering wheel 31 thereof, for example, while wearing the wristwatch wearable terminal 20 illustrated in FIG. 2.

Although the vehicle 30 is an automobile in the example illustrated in FIG. 1, the present disclosure is not limited thereto. The vehicle 30 may be a self-driving vehicle, a motorcycle, a bicycle, a small aircraft, or the like or may be any object on which the navigation terminal 10 can be mounted. The following description will be given assuming that the navigation system 1 is used in the manner illustrated in FIG. 1.

The navigation system 1 in the present embodiment includes the navigation terminal 10, which performs route navigation for a user by using a map, and the wearable terminal 20, as illustrated in FIG. 3.

A server 40 transmits, to the navigation terminal 10, information regarding a feature spot (described below) and information regarding a location that can be used for the navigation terminal 10 to determine a navigation-terminal location. The server 40 may be, for example, a global positioning system (GPS) or a Wi-Fi access point. The server 40 may also be a server on a network external to the navigation system 1. In this case, the server 40 may obtain information about the navigation-terminal location from the navigation terminal 10, may transmit map information including the navigation-terminal location to the navigation terminal 10 as the aforementioned information regarding the location, and may further transmit, to the navigation terminal 10, information indicating a route navigation on the basis of the obtained navigation-terminal location and the map information. The information indicating the route navigation may include the information regarding the feature spot. The server 40 may transmit, to the navigation terminal 10, map information as the information regarding the location and the information regarding the feature spot, and the navigation terminal 10 may determine the navigation-terminal location and extract a map including the navigation-terminal location and a feature spot from the map information by using the determined navigation-terminal location. The map information is the so-called road map and include information about the shape and the location of each road and the feature spot.

The following description will be given of the configurations of the navigation terminal 10 and the wearable terminal 20.

[Navigation Terminal 10]

As illustrated in FIG. 3, the navigation terminal 10 includes a communication interface 101, a computer 102, and an alerter 103. Based on the navigation-terminal location, the navigation terminal 10 notifies the user about a feature spot that should be recognized by the user so that it can be easily recognized by him or her, by using appropriate means at a timing appropriate for the user.

<Alerter 103>

The alerter 103 alerts the user of the navigation terminal 10. In this case, by starting a program stored in a built-in storage 1004 (described below), the alerter 103 alerts the user by using means that differs from vibration and that includes sound. For example, the alerter 103 may alert the user via visual sense by using a character message or the like or may alert the user via auditory sense by using a sound message or a warning sound.

<Communication Interface 101>

The communication interface 101 is, for example, a communication adapter and communicates with the wearable terminal 20 and the server 40. More specifically, the communication interface 101 communicates with a computer 202 in the wearable terminal 20 through a wireless communications network, such as a Bluetooth (registered trademark) or Wi-Fi network, and via a communication interface 201 in the wearable terminal 20. The communication interface 101 also receives information regarding a location from the server 40.

Under the control of the computer 102, the communication interface 101 transmits, to the wearable terminal 20, a signal for activating or stopping vibration provided by a vibration function 203 of the wearable terminal 20. The communication interface 101 may also transmit, to the wearable terminal 20, a signal for making vibration provided by the vibration function 203 larger than a predetermined value or a signal for making vibration provided by the vibration function 203 smaller than a predetermined value. The predetermined value for the vibration may be a vibration magnitude (a default value) pre-defined by the vibration function 203 of the wearable terminal 20 or may be a previous vibration magnitude (a previous value) of the vibration function 203.

In the present embodiment, the communication interface 101 receives operational information indicating the user's operation on the steering wheel 31 of the vehicle 30, the user's operation being detected by sensors included in the wearable terminal 20. In addition, the communication interface 101 may receive, from the wearable terminal 20, biometric information of the user who wears the wearable terminal 20. In this case, the communication interface 101 may receive the operational information or the biometric information from the wearable terminal 20 at all times or at a certain timing. The communication interface 101 may also receive the operational information or the biometric information that is transmitted from the wearable terminal 20 according to request information transmitted from the communication interface 101 to the wearable terminal 20. In addition, the biometric information may be detected by the sensors included in the wearable terminal 20.

When the server 40 is located on a network external to the navigation system 1, the communication interface 101 may communicate with the server 40 to obtain, from the server 40, map information and a route for route navigation. In this case, the communication interface 101 may determine the navigation-terminal location by receiving information, that is, radio waves, regarding a location from GPS satellites or may determine the navigation-terminal location by receiving information regarding a location from a Wi-Fi access point.

<Computer 102>

Figure 4:
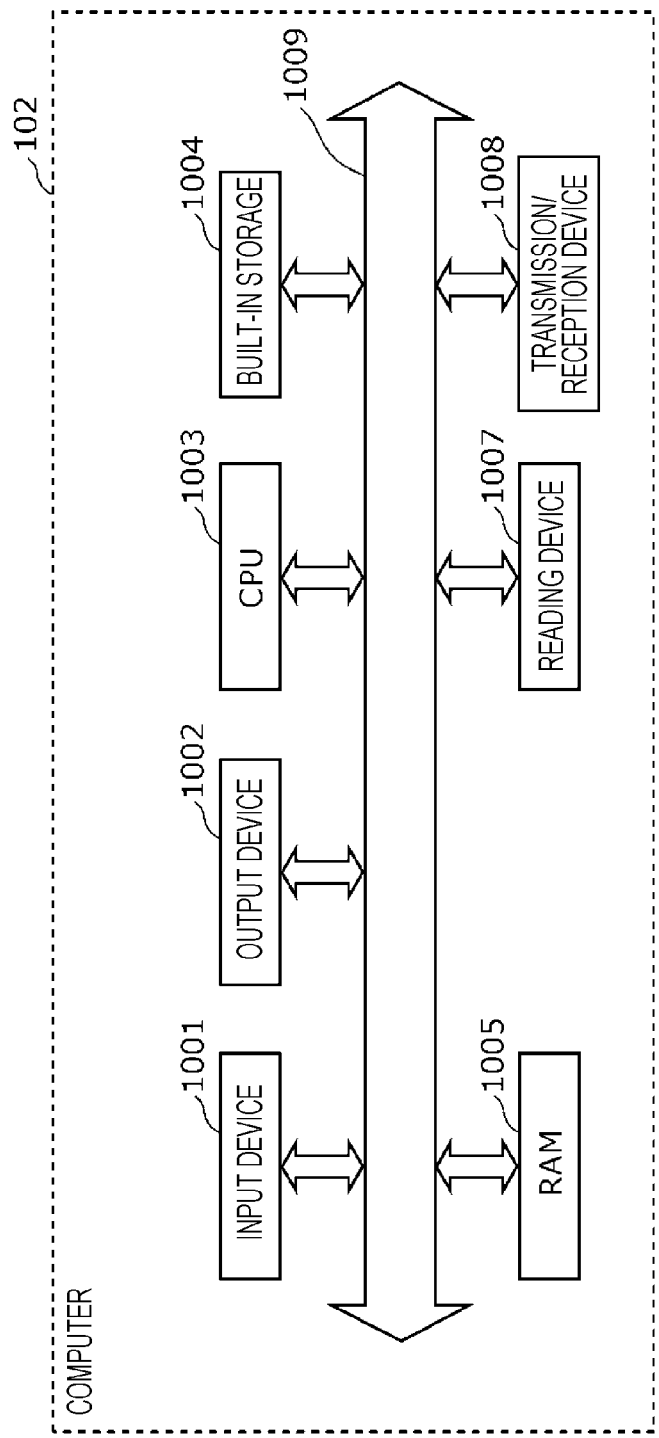
FIG. 4 is a block diagram illustrating one example of the hardware configuration of a computer in a navigation terminal illustrated in FIG. 3.

The computer 102 realizes the functions of the navigation terminal 10 in cooperation with software. Now, one example of the hardware configuration of the computer 102 will be described with reference to FIG. 4. FIG. 4 is a block diagram illustrating one example of the hardware configuration of the computer 102 in the navigation terminal 10 illustrated in FIG. 3.

As illustrated in FIG. 4, the computer 102 includes an input device 1001, an output device 1002, a central processing unit (CPU) 1003, the aforementioned built-in storage 1004, a random-access memory (RAM) 1005, a reading device 1007, a transmission/reception device 1008, and a bus 1009. The input device 1001, the output device 1002, the CPU 1003, the built-in storage 1004, the RAM 1005, the reading device 1007, and the transmission/reception device 1008 are connected to each other through the bus 1009.

The input device 1001 serves as a user interface, such as an input button, a touch pad, or a touch panel display, and receives the user's operation. In addition to receiving the user's contact operation, the input device 1001 may have a configuration for receiving an operation via sound or a remote operation via a remote controller or the like. In the present embodiment, the input device 1001 may be used for destination-information input performed by the user. The output device 1002 serves as a user interface, such as a display, and displays map information and a route calculated for route navigation or projects the map information or the route onto a screen or glass of a window or the like. The output device 1002 may be a projector or the like and may display map information and a route calculated for route navigation or may project the map information and the route onto a screen or glass of a window or the like. In addition, the output device 1002 may be a speaker for outputting sound, in addition to displaying information. One example of the built-in storage 1004 is a flash memory. A program for realizing the functions of the computer 102 or an application for implementing functions utilizing the functional configurations may be pre-stored in the built-in storage 1004. In the present embodiment, the built-in storage 1004 may be adapted to store map information obtained from the server 40 or may pre-store map information. The built-in storage 1004 may also be adapted to store a route for route navigation, the route being calculated by the server 40 or the navigation terminal 10. The built-in storage 1004 may be adapted to store destination information input by the user with the input device 1001 or may pre-store destination information input to the wearable terminal 20.

The RAM 1005 is used to store data and so on during execution of a program or an application. The reading device 1007 reads information from a recording medium, such as a Universal Serial Bus (USB) memory. The reading device 1007 reads a program or application as described above from a recording medium in which the program or the application is recorded and causes the read program or application to be stored in the built-in storage 1004. The transmission/reception device 1008 is a device for performing communication in a wireless or wired manner by using the communication interface 101. By using the communication interface 101 to communicate with the wearable terminal 20, the transmission/reception device 1008 may obtain destination information input to the wearable terminal 20 and cause the destination information to be stored in the built-in storage 1004. Also, by using the communication interface 101 to communicate with, for example, the server 40 connected to a network, the transmission/reception device 1008 may download a program or application as described above from the server 40 and cause the program or application to be stored in the built-in storage 1004, or may obtain map information from the server 40 and cause the map information to be stored in the built-in storage 1004.

The transmission/reception device 1008 communicates with the wearable terminal 20 to obtain information by using the communication interface 101 and causes the information to be stored in the built-in storage 1004. The CPU 1003 copies the program and application stored in the built-in storage 1004 to the RAM 1005, sequentially reads instructions included in the program and application from the RAM 1005, and executes the instructions.

Next, a specific description will be given of the functions of the navigation terminal 10, the functions being realized by the computer 102.

For example, based on information received from the server 40, the computer 102 determines a navigation-terminal location, which is the location of the navigation terminal 10. The computer 102 may also calculate a route for executing route navigation, based on destination information input by the user or the like, map information, and the determined navigation-terminal location. The computer 102 executes route navigation based on the calculated route.

Also, when the distance between a feature spot that is located on the calculated route and that should be recognized by the user and the navigation-terminal location becomes smaller than or equal to a first distance, the computer 102 causes the alerter 103 to alert the user. When the distance between the feature spot and the navigation-terminal location becomes smaller than or equal to a second distance, which is smaller than the first distance, the computer 102 causes the communication interface 101 to transmit, to the wearable terminal 20, a signal for activating vibration provided by the vibration function 203 of the wearable terminal 20.

(Feature Spot)

The "feature spot" as used herein includes at least one of a corner point, a diverging point, and a target object on a calculated route. Examples of the feature spot will be described below with reference to FIGS. 5A to 5C.

Figure 5A:
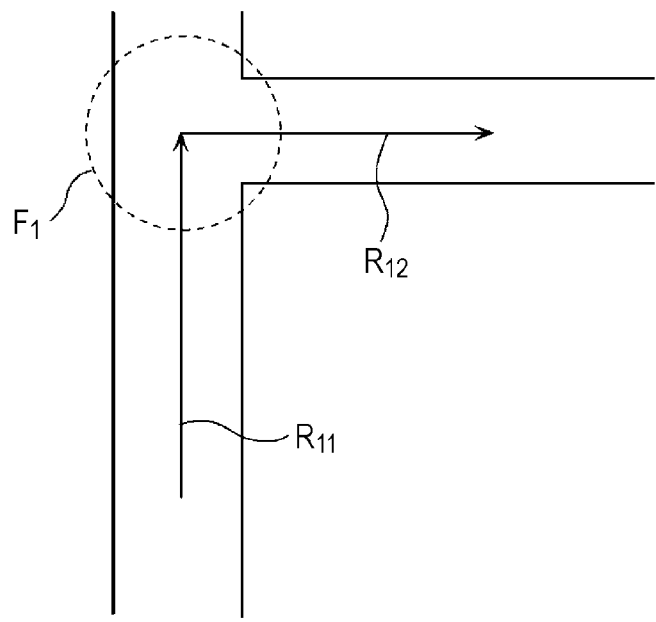
FIG. 5A is a diagram illustrating one example of a feature spot on a route according to the embodiment.
Figure 5B:
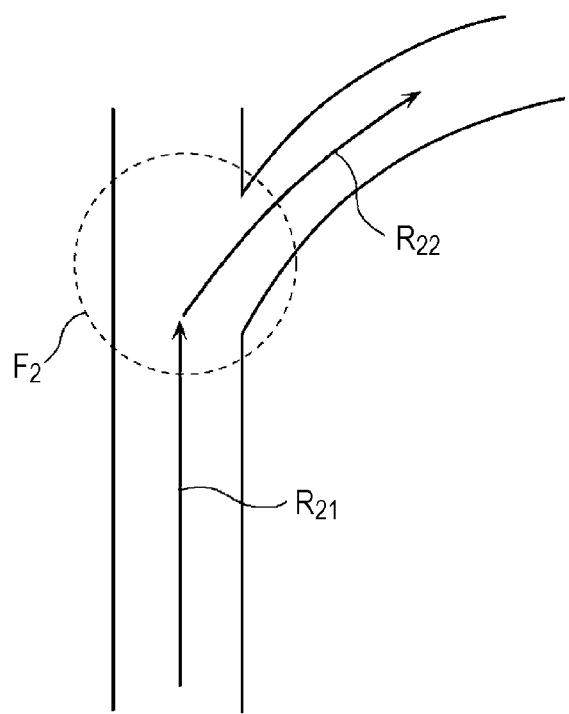
FIG. 5B is a diagram illustrating one example of a feature spot on a route according to the embodiment.
Figure 5C:
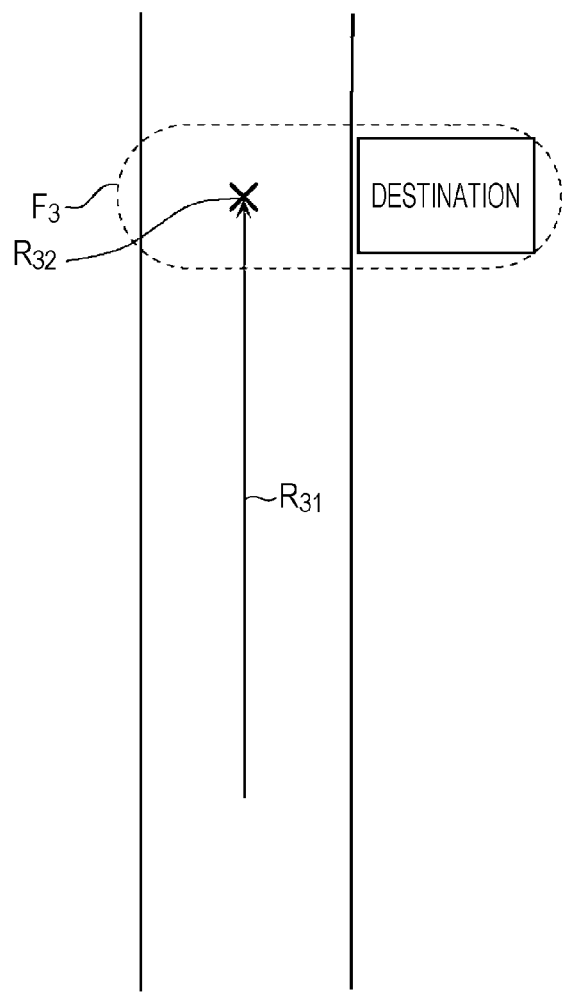
FIG. 5C is a diagram illustrating one example of a feature spot on a route according to the embodiment.

FIGS. 5A to 5C are diagrams illustrating examples of a feature spot on a route according to the present embodiment.

The feature spot may be, for example, a corner point F1 on calculated routes R11 and R12, as illustrated in FIG. 5A, or may be, for example, a diverging point F2 on calculated routes R21 and R22, as illustrated in FIG. 5B. Also, the feature spot may be a destination point R32 where a target object, such as an intended facility or an intended shop, is located on a calculated route R23, as illustrated in FIG. 5C. That is, the feature spot may be any spot that the user should recognize on a route.

(First Distance and Second Distance)

Next, the first distance and the second distance will be described with reference to FIGS. 6 to 8.

Figure 7:
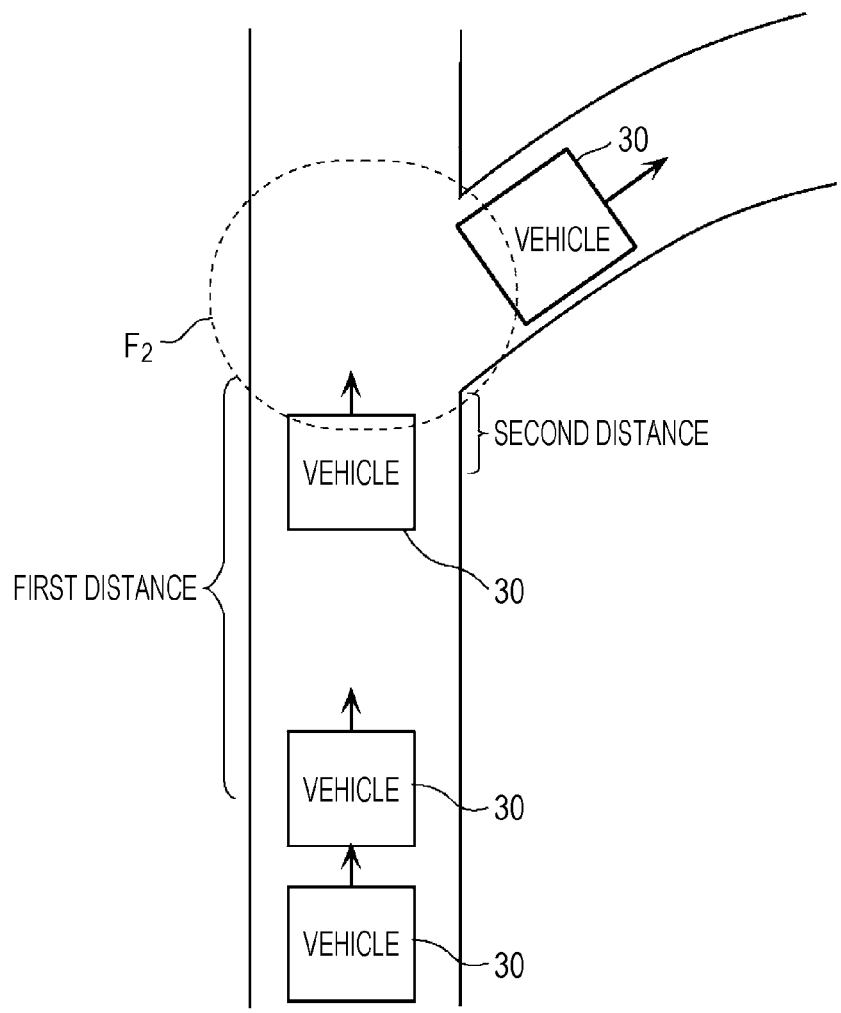
FIG. 7 is a diagram illustrating one example of a first distance and a second distance on a route according to the present embodiment.

FIGS. 6 to 8 are diagrams illustrating examples of the first distance and the second distance on a route according to the present embodiment.

The first distance is the distance between a feature spot and the location of the navigation terminal 10, and the user of the navigation terminal 10 can be pre-notified about the first distance. The first distance differs depending upon an object on which the navigation terminal 10 is mounted. In the present embodiment, since the navigation terminal 10 is mounted on the vehicle 30, such as an automobile, the first distance is the distance between a feature spot F1, F2, or F3 and the vehicle 30, as illustrated in FIGS. 6 to 8, and is, for example, a distance on the order of hundred meters, such as 700 or 300 m. When the navigation terminal 10 is mounted on a vehicle, such as a bicycle, the first distance may be set to a distance on the order of tens of meters.

This makes it possible to give two-stage instructions so that the user can more easily recognize a feature spot that the user should recognize. More specifically, in the second stage, the navigation terminal 10 can directly notify the user at a timing appropriate for the user by using vibration of the wearable terminal 20 worn by the user.

The second distance is a distance with which the user who uses the navigation terminal 10 can take an action immediately (a few seconds) after he or she is notified, and is the distance between a feature spot and the location of the navigation terminal 10. The second distance also differs depending upon an object on which the navigation terminal 10 is mounted. In the present embodiment, since the navigation terminal 10 is mounted on the vehicle 30, such as an automobile, the second distance is the distance between the feature spot F1, F2, or F3 and the vehicle 30, as illustrated in FIGS. 6 to 8, and is a distance on the order of tens of meters, such as 10 to 50 m. When the navigation terminal 10 is mounted on a vehicle, such as a bicycle, the first distance may be a distance on the order of tens of meters.

Also, when the communication interface 101 receives, from the wearable terminal 20, biometric information (e.g., a heart rate, a body temperature, or a respiration rate) of the user who wears the wearable terminal 20, the computer 102 adjusts the second distance, based on the biometric information received by the communication interface 101. This is because, when the user is relaxed or excited, he or she does not immediately notice a notification even when it is given with vibration provided by the vibration function 203. For example, when the user is excited, the pre-set second distance may be increased so as to ensure that he or she notices the vibration provided by the vibration function 203.

For example, in a case in which the biometric information is a heart rate, the computer 102 can determine that the level of excitement of the user is high when the value of the biometric information is large. Thus, when the value of the biometric information is larger than a predetermined value, a distance increased from the pre-set second distance may be used as the second distance. Also, when the user is relaxed, the pre-set second distance may be reduced. This is because, since the user is settled, it can be thought that he or she can reliably notice the vibration provided by the vibration function 203.

For example, when the user is excited, a method for causing the user to reliably notice the vibration provided by the vibration function 203 is not limited to the method for increasing the second distance, and the vibration may be made larger than a predetermined value. In contrast, when the user is settled, the vibration provided by the vibration function 203 may be reduced. That is, in accordance with the value of the biometric information received by the communication interface 101, the computer 102 may be adapted to cause the communication interface 101 to transmit, to the wearable terminal 20, a signal for making the vibration provided by the vibration function 203 larger than a predetermined value or a signal for making the vibration provided by the vibration function 203 smaller than a predetermined value.

In the present embodiment, based on operational information received by the communication interface 101, the computer 102 determines whether or not the user has turned the steering wheel 31 of the vehicle 30 a predetermined angle or more and determines whether or not the vehicle 30 has turned at a feature spot, such as a corner or a diverging point. The computer 102 then executes route navigation corresponding to a result of the determination.

More specifically, it is assumed that the computer 102 determines that the distance between the feature spot on the route and the navigation-terminal location is smaller than or equal to the second distance, and an operation indicated by the operational information is an operation of turning the steering wheel 31 of the vehicle 30 the predetermined angle or more. In this case, regarding the vehicle 30 as having turned at the feature spot on the route, the computer 102 causes the communication interface 101 to transmit a signal for stopping the vibration provided by the vibration function 203 to the wearable terminal 20.

On the other hand, it is assumed that the computer 102 determines that the distance between the feature spot on the route and the navigation-terminal location is smaller than or equal to the second distance and an operation indicated by the operational information is not an operation of turning the steering wheel 31 of the vehicle 30 the predetermined angle or more. In this case, regarding the vehicle 30 as having passed the feature spot on the route without turning thereat, the computer 102 may recalculate the route based on the destination information, the map information, and the current navigation-terminal location, and may cause the communication interface 101 to transmit a signal for stopping the vibration provided by the vibration function 203 to the wearable terminal 20.

Also, it is assumed that the computer 102 determines that the distance between the feature spot on the route and the navigation-terminal location is larger than the second distance and an operation indicated by the operational information is an operation of turning the steering wheel 31 of the vehicle 30 the predetermined angle or more. In this case, regarding the vehicle 30 as having turned at a spot other than the feature spot on the route, the computer 102 may cause the communication interface 101 to transmit a signal for stopping the vibration provided by the vibration function 203 to the wearable terminal 20.

[Wearable Terminal 20]

The wearable terminal 20 includes the communication interface 201, the computer 202, and the vibration function 203, and is worn in contact with part of the user's body.

In the present embodiment, a description will be given assuming that the wearable terminal 20 is a band-type (wristwatch-type) device, as illustrated in FIG. 2, and the wearable terminal 20 is worn on an upper limb (arm) of the user. The wearable terminal 20 is not limited to a band-type (wristwatch-type) device and may be a finger-ring-shaped device, an eyeglass-type device, or a head-mount-type device. That is, the wearable terminal 20 is a device that can be worn on a portion of the user's body and may be any device having a functional configuration described below.

<Vibration Function 203>

The vibration function 203 gives a tactile notification to the user of the navigation terminal 10 via vibration or the like. The method for giving the tactile notification is not limited to vibration. A small needle may be thrusted, or a device that deforms with an air pressure or voltage may be used to fasten a band of the wearable terminal 20.

<Communication Interface 201>

The communication interface 201 is, for example, a communication adapter and communicates with the navigation terminal 10. More specifically, the communication interface 201 communicates with the computer 102 in the navigation terminal 10 through a wireless communications network, such as a Bluetooth (registered trademark) or Wi-Fi network, and via the communication interface 101 of the navigation terminal 10.

In the present embodiment, the communication interface 201 receives a signal for activating or stopping vibration provided by the vibration function 203, the signal being transmitted from the navigation terminal 10, and sends the signal to the computer 202. The communication interface 201 also receives a signal for making the vibration provided by the vibration function 203 smaller than or larger than a predetermined value, the signal being transmitted from the navigation terminal 10, to the computer 202. The communication interface 201 also transmits operational information indicating the user's operation on the steering wheel 31 of the vehicle 30 to the navigation terminal 10, the operation being detected by sensors (not illustrated) included in the wearable terminal 20.

Herein, the sensors included in the wearable terminal 20 are acceleration sensors and gyro-sensors. Upon detecting an operation of the upper limb of the user who wears the wearable terminal 20, the sensors can detect an angle with which the steering wheel 31 of the vehicle 30 is steered.

When the wearable terminal 20 obtains biometric information of the user who wears the wearable terminal 20, the communication interface 201 may transmit the biometric information to the navigation terminal 10. Also, when the user inputs destination information to the wearable terminal 20, the communication interface 201 may transmit the destination information to the navigation terminal 10.

<Computer 202>

The computer 202 realizes the functions of the wearable terminal 20 in cooperation with software. Since the hardware configuration of the computer 202 is substantially the same as that illustrated in FIG. 4, a description thereof is not given hereinafter.

In accordance with a signal for activating or stopping vibration provided by the vibration function 203, the signal being transmitted from the navigation terminal 10, the computer 202 activates (starts) or stops the vibration provided by the vibration function 203. Also, in accordance with a signal for making vibration provided by the vibration function 203 smaller than or larger than a predetermined value, the signal being transmitted from the navigation terminal 10, the computer 202 activates (starts) or stops the vibration provided by the vibration function 203.

The computer 202 also causes the communication interface 201 to transmit, to the navigation terminal 10, operational information indicating the user's operation on the steering wheel 31 of the vehicle 30, the operation being detected by the sensors (not illustrated).

Also, when the wearable terminal 20 obtains biometric information of the user who wears the wearable terminal 20, the computer 202 causes the communication interface 201 to transmit the obtained biometric information to the navigation terminal 10.

The wearable terminal 20 further may include a display input unit, and the user may input the above-described destination information to the display input unit. Also, the wearable terminal 20 may further include a voice input unit, and the user may input the above-described destination information to the voice input unit by means of voice.

[Operation of Navigation System 1]

Next, an operation example of the navigation system 1 configured as described below will be described with reference to FIG. 9.

FIG. 9 is a flowchart illustrating one example of the operation of the navigation system 1 according to the embodiment. The following description will be given of a case in which the navigation terminal 10 is mounted on the vehicle navigator 10a installed in the vehicle 30, as illustrated in FIG. 1, and the server 40 is placed, for example, external to the navigation system 1 and transmits map information as information regarding a location.

First, the navigation terminal 10 receives information regarding a location from the server 40, and based on the received information regarding the location, the navigation terminal 10 determines a navigation-terminal location, which is the location of the navigation terminal 10 (S11).

Next, when the user or the like inputs a destination (S12) to the navigation terminal 10, the navigation terminal 10 communicates with the server 40 to transmit information indicating the destination together with information indicating the navigation-terminal location.

Next, based on map information, the obtained destination information, and the information indicating the navigation-terminal location (the location of the navigation terminal 10), the server 40 calculates a route for executing route navigation (S13) and transmits route information including the calculated route to the navigation terminal 10.

Upon receiving the route information, the navigation terminal 10 starts route navigation, based on the route information (S14).

Thereafter, the navigation terminal 10 determines whether or not the navigation-terminal location is located on the calculated route and the distance between a feature spot that should be recognized by the user and the navigation-terminal location becomes smaller than or equal to a first distance (S15).

Upon determining that the navigation-terminal location is located on the calculated route and the distance between the feature spot to be recognized by the user and the navigation-terminal location becomes smaller than or equal to the first distance (YES in S15), the navigation terminal 10 alerts the user, for example, by using a sound message (S16).

Next, upon determining that the navigation-terminal location is located on the calculated route and the distance between the feature spot that should be recognized by the user and the navigation-terminal location becomes smaller than or equal to a second distance (YES in S17), the navigation terminal 10 transmits, to the wearable terminal 20, a signal for activating vibration provided by the vibration function 203 of the wearable terminal 20.

Then, the wearable terminal 20 vibrates in accordance with the received signal for activating vibration provided by the vibration function 203 (S18).

Thus, by giving the two types of notifications to the user of the navigation terminal 10, the navigation terminal 10 allows the user to more easily recognize a feature spot, such as a corner, and to take an action at the feature spot, such as turning at the corner.

[Advantages, Etc.]

As described above, the navigation terminal 10 according to one aspect of present disclosure can give a notification with which the user can more easily recognize a feature spot he or she should recognize.

As described above, the navigation terminal can directly notify the user at a timing appropriate for the user by using vibration of the wearable terminal worn by the user, in addition to a typical alert from the navigation terminal. That is, with respect to a feature spot the user should recognize, two-stage notifications can be given so that the user can more easily recognize. As a result, it is possible to give a notification with which the user can more easily recognize a feature spot he or she should recognize.

Specifically, for example, at a location that is far from a feature spot, such as a corner, the user receives a first notification using sound from the navigation terminal, and at a location that is close to a feature spot, such as a corner, the user receives a second notification using means, such as vibration of the wearable terminal, for stimulating a tactile sense, the means being more noticeable than the notification given by the navigation terminal. Thus, the user can more easily recognize the feature spot.

Modifications

Although the above description in the embodiment has been given of an example in which the navigation terminal 10 is mounted on the vehicle 30, such as an automobile, the present disclosure is not limited thereto. The navigation terminal 10 may be mounted on a portable terminal, such as a smartphone, the smartphone may be mounted on the vehicle 30, and the user may carry the smartphone with him/her while walking.

When the user carries and uses the portable terminal including the navigation terminal 10 while walking, the first distance may be set to be on the order of tens of meters and the second distance may be set to a distance on the order of tens of centimeters for the navigation terminal 10. Also, the navigation terminal 10 may obtain, from the wearable terminal 20, information indicating a movement direction detected by sensors, such as an acceleration sensor and a gyro-sensor, included in the wearable terminal 20, and may detect that the navigation terminal 10 (user) turns at or diverges from a feature spot, based on the map information and the navigation-terminal location.

More specifically, when the distance between the feature spot on the route and the navigation-terminal location is smaller than or equal to the second distance, and the computer 102 in the navigation terminal 10 detects that the navigation terminal 10 turns at or diverges from the route on the basis of the navigation-terminal location and the map information, the computer 102 may cause the communication interface 101 to transmit a signal for stopping vibration provided by the vibration function 203 to the wearable terminal 20.

Also, when the distance between the feature spot on the route and the navigation-terminal location is smaller than or equal to the second distance, and the computer 102 in the navigation terminal 10 does not detect that the navigation terminal 10 turns at or diverges from the route on the basis of the navigation-terminal location and the map information, the computer 102 may recalculate the route on the basis of the destination information, the map information, and the navigation-terminal location and may cause the communication interface 101 to transmit a signal for stopping vibration provided by the vibration function 203 to the wearable terminal.

Also, when the distance between the feature spot on the road and the navigation-terminal location is larger than the second distance, and the computer 102 in the navigation terminal 10 detects that the navigation terminal 10 turns at or diverges from the route on the basis of the navigation-terminal location and the map information, the computer 102 may cause the communication interface 101 to transmit a signal for stopping vibration provided by the vibration function 203 to the wearable terminal 20.

Thus, the navigation terminal 10 according to this modification can directly notify the user at a timing appropriate for the user by using vibration of the wearable terminal worn by the user, thus making it possible to give a notification with which the user can more easily recognize a feature spot he or she should recognize.

Specifically, for example, at a location that is far from a feature spot, such as a corner, the user receives a notification using sound from the navigation terminal, and at a location that is close to a feature spot, such as a corner, the user receives a notification using means, such as vibration of the wearable terminal, for stimulating a tactile sense, the means being more noticeable than the notification given by the navigation terminal. Thus, the user can more easily recognize the feature spot.

Other Embodiments, Etc.

The above-described embodiment is merely an example, and it goes without saying that various modifications, additions, omissions, and so on can be made thereto.

The route calculation function for the above-described navigation terminal 10 and so on may be implemented by the navigation terminal 10 or may be implemented by the server 40.

All or part of the above-described operation procedure of the navigation terminal 10 or the like may be realized by the hardware of the navigation terminal 10 or the like or may be realized using software. Processing using software may be realized when a processor included in the navigation terminal 10 or the like executes a control program stored in a memory. The control program may also be recorded in recording media and be distributed or circulated. For example, when the distributed control program is installed in a device and is executed by a processor in the device, for example, the device can perform all or some of the above-described operations of the navigation terminal 10.

Modes obtained by arbitrarily combining the constituent elements and the functions described in the above embodiments are also encompassed by the scope of the present disclosure.

It should be noted that general or specific aspects of the present disclosure may be implemented as an apparatus, a device, a system, a method, an integrated circuit, a computer program, a computer-readable recording medium, or a combination of one or more thereof.

In addition, modes obtained by making various modifications conceived by those skilled in the art to the embodiments or modes realized by arbitrarily combining the constituent elements and the functions in the embodiments within a scope that does not depart from the spirit of the present disclosure are also encompassed by the present disclosure.

The present disclosure is applicable to a navigation terminal, a navigation system, a wearable terminal, a navigation method, and a program, and is particularly applicable to a navigation terminal mounted on a vehicle (such as an automobile, a motorcycle, or a bike) or a portable terminal, a navigation system, a wearable terminal, and a navigation method, and a program.

What is claimed is:

1. A navigation terminal comprising:
a communicator;
an alerter; and
a processor,
wherein the processor
obtains destination information indicating a destination of a user,
obtains first location information indicating a location of the navigation terminal,
starts navigation in accordance with first route information including a first route from the location indicated by the first location information to the destination, the first route being calculated based on the destination information and the first location information,
obtains second location information indicating the location of the navigation terminal after starting the navigation,
determines whether or not a distance from the location indicated by the second location information to a predetermined spot becomes smaller than or equal to a first distance based on the first route information, the predetermined spot being indicated by the first route information and being located on the first route,
starts the alerter of the navigation terminal to alert the user, when it is determined that the distance from the location indicated by the second location information to the predetermined spot becomes smaller than or equal to the first distance,
after the alerter is started, determines whether or not the distance from the location indicated by the second location information to the predetermined spot becomes smaller than or equal to a second distance, which is smaller than the first distance, and
causes the communicator to transmit a control signal to a wearable terminal for vibrating a vibrator included in the wearable terminal worn by the user, when it is determined, after the alerter is started, that the distance from the location indicated by the second location information to the predetermined spot becomes smaller than or equal to the second distance.

2. The navigation terminal according to claim 1, further comprising:
a speaker,
wherein, by causing the speaker to output sound, the alerter alerts the user that the distance from the location indicated by the second location information to the predetermined spot becomes smaller than or equal to the first distance.

3. The navigation terminal according to claim 1, further comprising:
a display,
wherein, by causing the display to display a message, the alerter alerts the user that the distance from the location indicated by the second location information to the predetermined spot becomes smaller than or equal to the first distance.

4. The navigation terminal according to claim 1,
wherein the navigation terminal is mounted on a vehicle;
the user is a driver of the vehicle;
the wearable terminal is worn on an upper limb of the user;
the communicator receives, from the wearable terminal, a result of detection of the user's operation on a steering wheel in the vehicle, the detection being performed by a sensor included in the wearable terminal; and
the processor causes the communicator to transmit the control signal for vibrating the vibrator, based on the result of the detection.

5. The navigation terminal according to claim 4,
wherein the processor
determines whether or not the user turns the steering wheel a predetermined angle or more, based on the result of the detection, and
causes the communicator to transmit a control signal for stopping the vibrator to the wearable terminal, when the distance from the location indicated by the second location information to the predetermined spot is smaller than or equal to the second distance, and it is determined that the user turns the steering wheel the predetermined angle or more.

6. The navigation terminal according to claim 4,
wherein the processor
determines whether or not the user turns the steering wheel a predetermined angle or more, based on the result of the detection, and
newly starts navigation in accordance with second route information including a route newly calculated based on the destination information and the second location information and causes the communicator to transmit a control signal for stopping the vibrator to the wearable terminal, when the distance from the location indicated by the second location information to the predetermined spot is smaller than or equal to the second distance, and it is determined that the user does not turn the steering wheel the predetermined angle or more.

7. The navigation terminal according to claim 1,
wherein the predetermined spot is a spot that is indicated by the first route information and where a diverging point on the route is located; and
the processor further
  determines whether or not the navigation terminal is traveling along the first route after passing the diverging point, based on the second location information and the first route information, and
  causes the communicator to transmit a control signal for stopping the vibrator to the wearable terminal, when the distance from the location indicated by the second location information to the predetermined spot is smaller than or equal to the second distance, and it is determined that the navigation terminal is traveling along the first route after passing the diverging point.

8. The navigation terminal according to claim 1,
wherein the predetermined spot is a spot that is indicated by the first route information and where a diverging point on the route is located; and
the processor further
  determines whether or not the navigation terminal is traveling along the first route after passing the diverging point, based on the second location information and the first route information, and
  newly starts navigation in accordance with second route information including a route newly calculated based on the destination information and the second location information and causes the communicator to transmit a control signal for stopping the vibrator to the wearable terminal, when the distance from the location indicated by the second location information to the predetermined spot is smaller than or equal to the second distance, and it is determined that the navigation terminal is not traveling along the first route after passing the diverging point.

9. The navigation terminal according to claim 1,
wherein the predetermined spot is a spot where a diverging point on the route exists, the spot being indicated by the first route information; and
the processor further
  determines whether or not the navigation terminal is traveling along the first route after passing the diverging point, based on the second location information and the first route information, and
  causes the communicator to transmit a control signal for stopping the vibrator to the wearable terminal, when the distance from the location indicated by the second location information to the predetermined spot is smaller than or equal to the first distance and is larger than the second distance, and it is determined that the navigation terminal is traveling along the first route after passing the diverging point.

10. The navigation terminal according to claim 1,
wherein the wearable terminal is worn on an upper limb of the user;
the communicator receives, from the wearable terminal, biometric information indicating a vital value of the user, the vital value being detected by a sensor included in the wearable terminal; and
the processor further
  sets the second distance to a length larger than a predetermined distance, when the vital value is larger than a predetermined value, and
  sets the second distance to a length smaller than or equal to the predetermined distance, when the vital value is smaller than or equal to the predetermined value.

11. The navigation terminal according to claim 10,
wherein the vital value includes one of a heart rate, a body temperature, and a respiration rate.

12. The navigation terminal according to claim 1,
wherein the wearable terminal is worn on an upper limb of the user;
the communicator receives, from the wearable terminal, biometric information indicating a vital value of the user, the vital value being detected by a sensor included in the wearable terminal; and
the processor further
  causes the communicator to transmit, to the wearable terminal, a control signal for making a magnitude of the vibration of the vibrator smaller than a predetermined value, when the vital value is larger than a predetermined value, and
  causes the communicator to transmit, to the wearable terminal, a control signal for making the magnitude of the vibration of the vibrator larger than or equal to the predetermined value, when the vital value is smaller than or equal to the predetermined value.

13. The navigation terminal according to claim 1,
wherein the navigation terminal is connected to a server; and
the communicator receives the first route information from the server.

14. The navigation terminal according to claim 1, further comprising:
a memory,
wherein the processor calculates the first route, based on map information stored in the memory, the destination information, and the first location information, the map information indicating locations and shapes of roads and the predetermined spot located along any of the roads.

15. The navigation terminal according to claim 1, further comprising:
a memory,
wherein the alerter comprises a program stored in the memory.

16. The navigation terminal according to claim 1, wherein
after the alerter is started, the processor further determines whether the location indicated by the second location information is on the first route, and
the processor causes the communicator to transmit the control signal to the wearable terminal for vibrating the vibrator included in the wearable terminal, when it is determined, after the alerter is started, that the location indicated by the second location information is on the first route, and the distance from the location indicated by the second location information to the predetermined spot becomes smaller than or equal to the second distance.

17. A navigation system, comprising:
a navigation terminal; and
a wearable terminal worn by a user,
wherein the navigation terminal includes
  a communicator,
  an alerter, and
  a processor, and wherein the processor
- obtains destination information indicating a destination of the user,
- obtains first location information indicating a location of the navigation terminal,
- starts navigation in accordance with first route information including a first route from the location indicated by the first location information to the destination, the first route being calculated based on the destination information and the first location information,
- obtains second location information indicating the location of the navigation terminal after starting the navigation,
- determines whether or not a distance from the location indicated by the second location information to a predetermined spot becomes smaller than or equal to a first distance based on the first route information, the predetermined spot being indicated by the first route information and being located on the first route, and
- starts the alerter of the navigation terminal to alert the user, when it is determined that the distance from the location indicated by the second location information to the predetermined spot becomes smaller than or equal to the first distance,
- after the alerter is started, determines whether or not the distance from the location indicated by the second location information to the predetermined spot becomes smaller than or equal to a second distance, which is smaller than the first distance, and
- causes the communicator to transmit a control signal to the wearable terminal for vibrating a vibrator included in the wearable terminal, when it is determined, after the alerter is started, that the distance from the location indicated by the second location information to the predetermined spot becomes smaller than or equal to the second distance.

18. A wearable terminal connected to the navigation system according to claim 17.

19. The navigation system according to claim 17, wherein the navigation terminal is mounted on a vehicle.

20. A vehicle connected to the navigation system according to claim 19.

21. A navigation method for a navigation terminal including an alerter and a communicator, the method comprising:
- obtaining destination information indicating a destination of the user;
- obtaining first location information indicating a location of the navigation terminal;
- starting navigation in accordance with first route information including a first route from the location indicated by the first location information to the destination, the first route being calculated based on the destination information and the first location information;
- obtaining second location information indicating the location of the navigation terminal after starting the navigation;
- determining whether or not a distance from the location indicated by the second location information to a predetermined spot becomes smaller than or equal to a first distance based on the first route information, the predetermined spot being indicated by the first route information and being located on the first route;
- starting the alerter of the navigation terminal to alert the user, when it is determined that the distance from the location indicated by the second location information to the predetermined spot becomes smaller than or equal to the first distance,
- after the alerter is started, determining whether or not the distance from the location indicated by the second location information to the predetermined spot becomes smaller than or equal to a second distance, which is smaller than the first distance, and
- causing the communicator to transmit a control signal to a wearable terminal for vibrating a vibrator included in the wearable terminal worn by the user, when it is determined, after the alerter is started, that the distance from the location indicated by the second location information to the predetermined spot becomes smaller than or equal to the second distance.

22. A non-transitory recording medium storing a program for causing a processor to execute the navigation method according to claim 21.

* * * * *